(No Model.) 4 Sheets—Sheet 2.
C. D. ROGERS.
MACHINE FOR MAKING WOOD SCREWS.
No. 370,353. Patented Sept. 20, 1887.
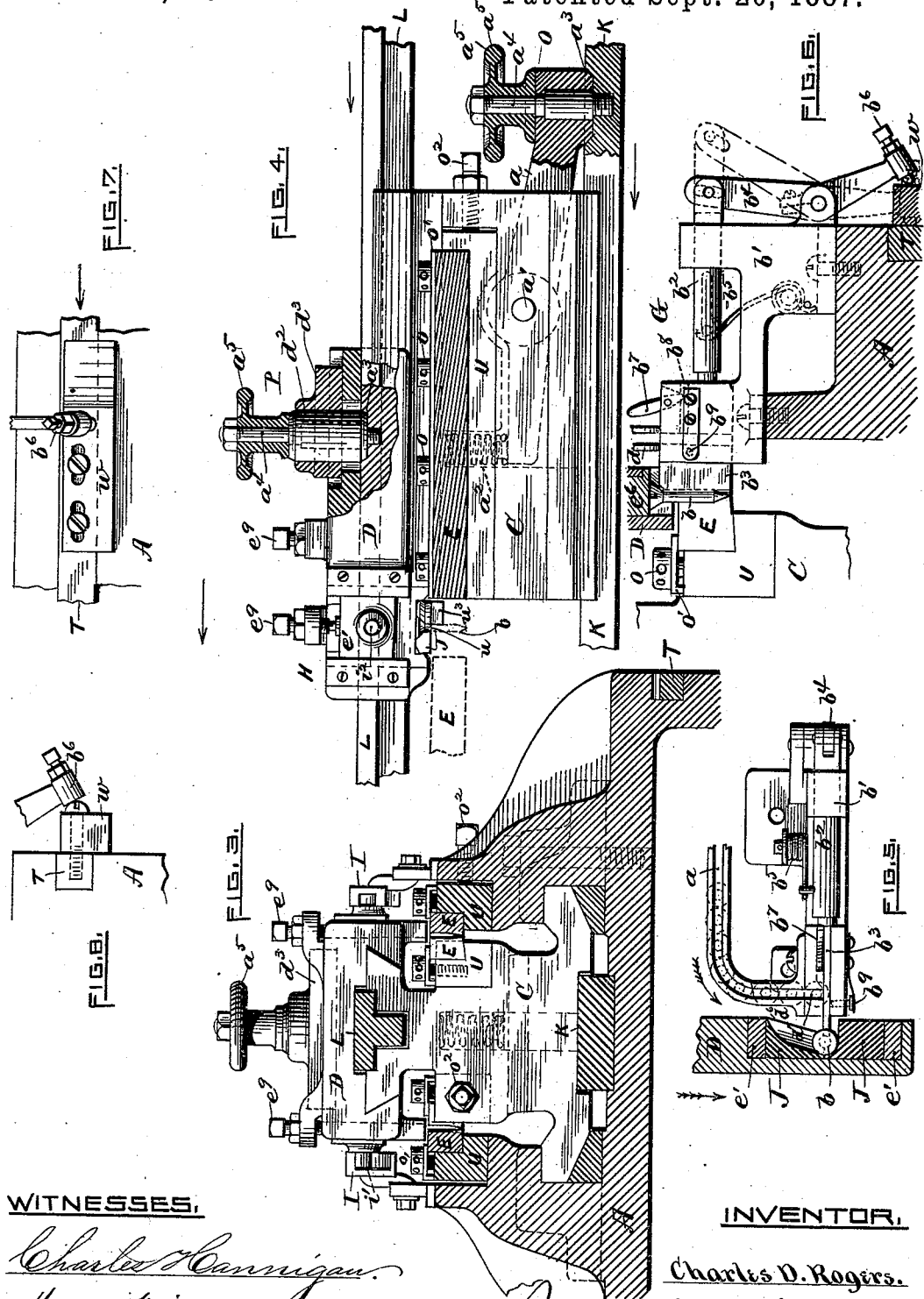
WITNESSES.
Charles Hannigan
Herbert Wilford
INVENTOR.
Charles D. Rogers.
by Remington & Henthorn
Att'ys.

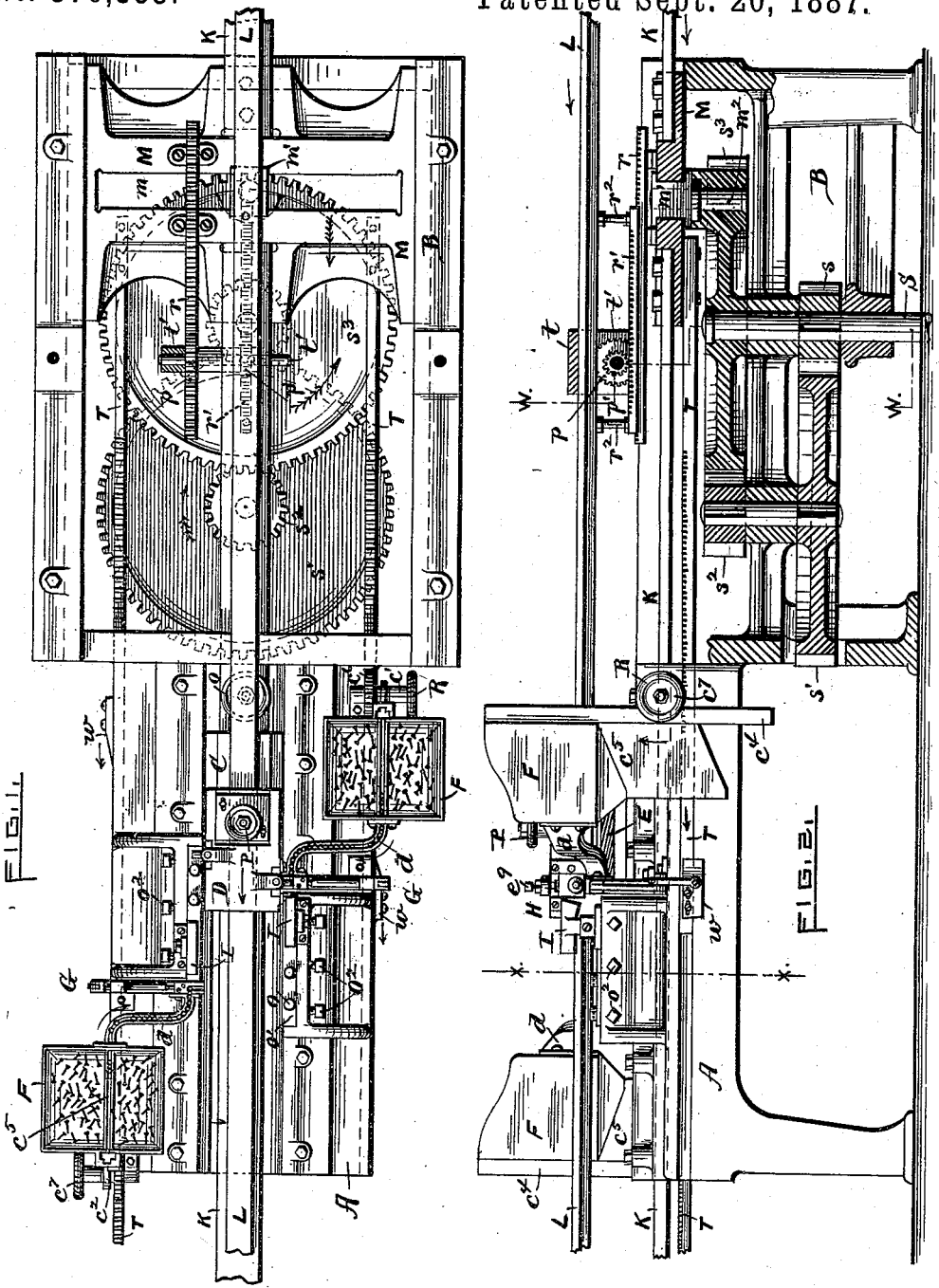

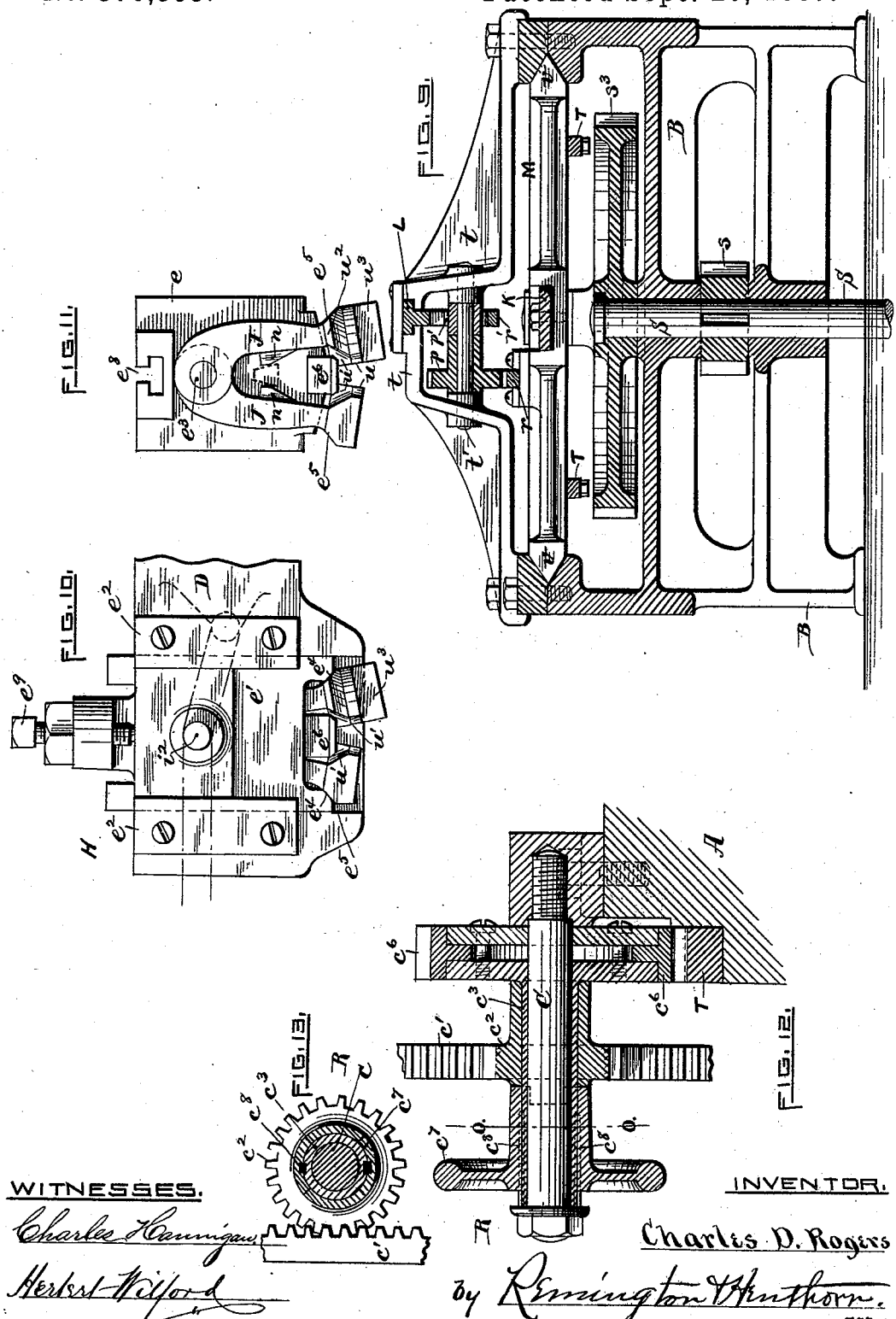

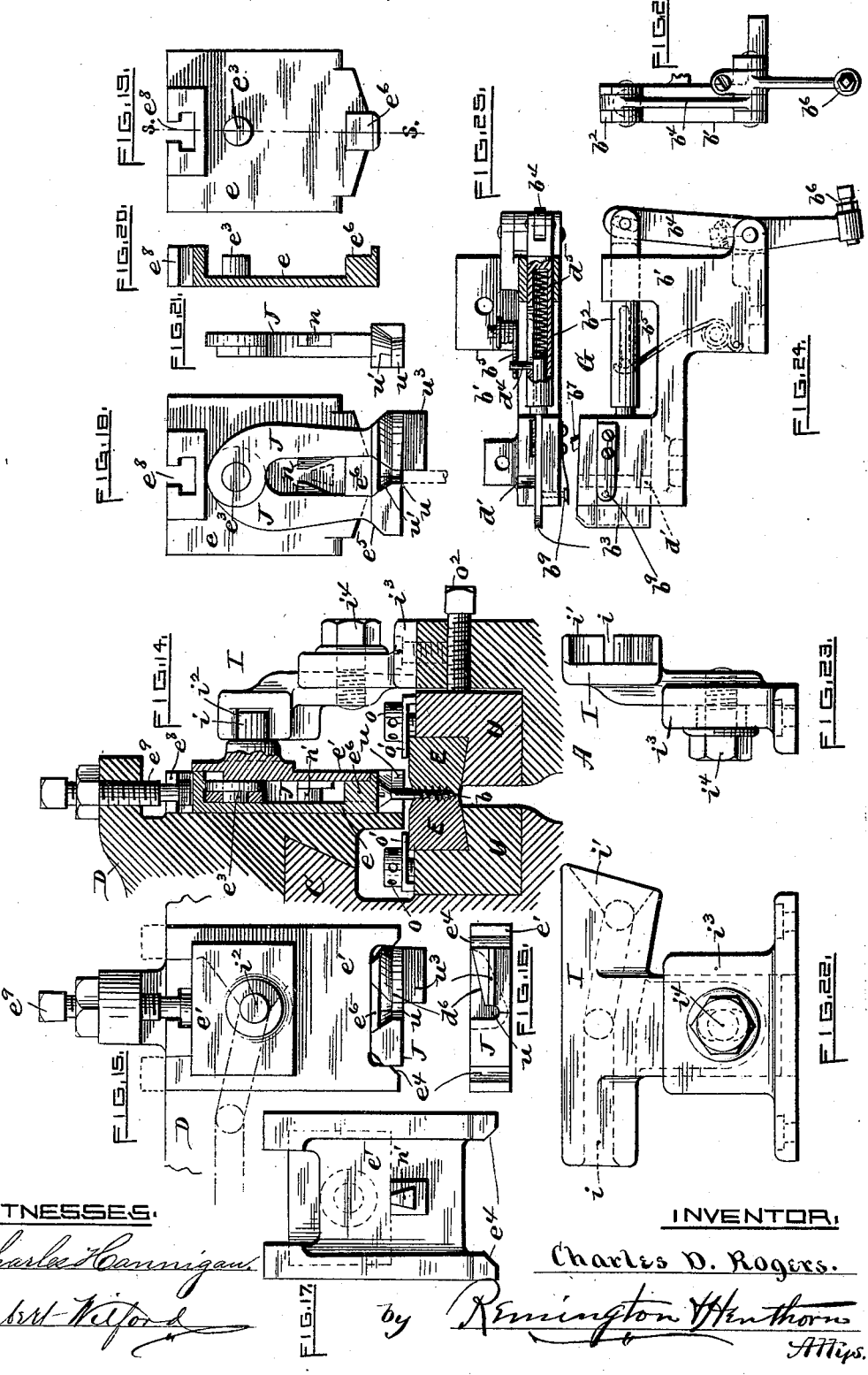

UNITED STATES PATENT OFFICE.

CHARLES D. ROGERS, OF PROVIDENCE, RHODE ISLAND, ASSIGNOR TO THE AMERICAN SCREW COMPANY, OF SAME PLACE.

MACHINE FOR MAKING WOOD-SCREWS.

SPECIFICATION forming part of Letters Patent No. 370,353, dated September 20, 1887.

Application filed May 11, 1887. Serial No. 237,822. (No model.)

*To all whom it may concern:*

Be it known that I, CHARLES D. ROGERS, a citizen of the United States, residing at Providence, in the county of Providence and State of Rhode Island, have invented certain new and useful Improvements in Machines for Making Wood-Screws; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to machines of the class adapted for automatically forming the threads upon wood-screws by rolling the blanks between the working or grooved faces of suitably mounted and operating dies.

The machine herein described, which embraces my invention, consists, essentially, of the following features: The work of forming the threads upon the screw-blanks is performed by a pair of straight dies, one of which is fixed to the frame of the machine, while the other is secured to a reciprocating bar or shaft which carries it back and forth parallel to and past the stationary die. A mechanism for automatically feeding the blanks to the dies is connected with the machine so as to introduce a blank at each return of the reciprocating die to the normal position from which its movement to form a thread upon a blank commences. In connection with the threading-dies and the feeding mechanism is a device, which I term a "carrier," which receives the blank from the said feeding mechanism, and presents it properly to the dies and insures its proper relation to them during the whole or a part of the threading operation. I consider this feature a very important element in the manufacture of wood-screws.

The machine illustrated in the annexed drawings has two oppositely-arranged complete threading, feeding, and carrying mechanisms, each connected with the reciprocating bar through which the power is applied, but each acting otherwise independently of the other.

The improved wood-screw, together with the dies for forming the threads, form the subjects of two separate applications for Letters Patent filed by me upon even date herewith, and serially numbered 237,823 and 237,824, respectively.

In the machine herewith the thread of the screw is raised from the body of the blank by compression and by rolling between dies provided with oblique V-shaped grooves, presenting between them a series of bars or projections narrow at the end where they commence to form the thread, and gradually increasing in width to act laterally upon the metal between them and force it into the grooves.

In the accompanying four sheets of drawings, illustrating my improved screw-threading machine, Figure 1, Sheet 1, represents a plan view thereof as provided with two sets of thread-forming dies, &c, the several parts being in the normal position. Fig. 2 is a side elevation, the driving-head or operating mechanism being sectionally represented. Fig. 3, Sheet 2, is a partial cross-sectional view, enlarged, taken on line *x x* of Fig. 1, showing an end view of the cross-head and carrier as mounted in the frame of the machine. Fig. 4 is a side view thereof, a portion being broken away to show the devices for detachably securing the cross-head and carrier to the reciprocating bars, which latter extend longitudinally of the machine. Fig. 5 is a plan view, in partial horizontal section, showing the device for conducting and intermittently placing the blanks in position in the holder. Fig. 6 is a side view of the same. Figs. 7 and 8 are side and end views, respectively, of the adjustably-mounted cam adapted to reciprocate the said conductor. Fig. 9, Sheet 3, is a vertical transverse sectional view of the driving-head, taken on line *w w* of Fig. 2. Fig. 10 is a front view of the blank-holder detached. Fig. 11 is a similar view, having the front plate removed, the jaws of the holder being in an open position preparatory to receiving a screw-blank. Fig. 12 is an enlarged vertical sectional view taken through the center of the blank "pick-up" driving mechanism. Fig. 13 is a transverse sectional view of the same, taken on line *o o*. Fig. 14, Sheet 4, is a vertical transverse sectional view taken through the holder, carrier, thread-forming dies, &c., showing a blank in the act of being threaded. Fig. 15 is a front view of the holder, showing the jaws closed. Fig. 16 is an inverted plan view thereof. Fig. 17 is a detached view of the front plate, showing its rear face. Fig. 18 is a front view showing the rear plate and the holder-jaws pivoted thereto, the jaws being closed. Fig. 19 is a front view of the rear plate detached. Fig. 20 is a vertical transverse sectional view thereof, taken on line $s\,s$. Fig. 21 is a side view of one of the jaws. Fig. 22 is a front view of an adjustably-mounted stationary stand adapted to engage the front plate of the holder to close the jaws. Fig. 23 is an end view of the same, and Figs. 24, 25, and 26 are detached front, plan, and end views, respectively, of the blank-feeding device.

The following is a detailed description of the screw-threading machine, including the manner of its operation:

A, referring again to the drawings, designates the main frame or bed thereof, constructed to receive the several parts and devices which constitute the machine.

B indicates the frame of the main driving-head, the latter consisting of a suitably mounted and driven shaft, as S, and a mounted gear-train, as $s$, $s'$, $s^2$, and $s^3$, the latter being loosely mounted on the upper end of the main shaft. To the main gear $s^3$ is fixed a pin, $m^2$, the upper portion of which is fitted into a rectangular box, $m'$, the latter in turn being fitted to slide in a slotted opening, $m$, formed in a cross-head, M. This cross-head is fitted to slide in longitudinal V's formed in the upper portion of the frame B. By means of this arrangement a rectilinear reciprocating movement is imparted to the cross-head through the medium of the revolving gear $s^3$ and the connected box $m'$.

K indicates a rod or bar rigidly secured to the cross-head and fitted to slide in the main frame A.

$t$ indicates a tie extending transversely across the top of the frame B, and firmly secured thereto. (See Fig. 9, &c.)

$t'$ is a short shaft mounted to revolve in bearings formed in the tie $t$. To the said shaft, intermediate of the bearings, are secured the two pinions $p\,p'$, the latter being just one-half the diameter of the pinion $p$. A rack, $r$, is secured to the upper side of the cross-head M, and arranged to intergear with the larger pinion $p$.

L designates an upper rod or bar extending lengthwise of the machine, the said bar being mounted in the same vertical plane as the lower bar, K, before referred to. A short toothed rack, $r'$, is secured to the under side of the bar L by means of studs $r^2$, Fig. 2. This latter-named rack is made to mesh with the teeth of the small pinion $p'$. It is obvious, now, that the bars K and L simultaneously travel in the same direction as the cross-head M, the rate of speed of the upper bar, L, however, being just one-half that of the lower bar.

The forming of the threads upon the screw-blanks is effected by the use of grooved dies, between the faces of which the blanks are rolled, thereby raising the metal from the body of the blank into the grooves of the dies, which gradually compress the metal into a screw-thread. In the machine herewith each set of grooved dies E E for forming the screw-threads upon the blanks $b$ are arranged so that one is stationary, the other being connected to the bar K, so as to move back and forth with it. At the place where the stationary die is located the frame A is made extremely strong to withstand the lateral thrust or pressure. This latter die is adjustably secured in position in a die-block, U, by means of a clamp, $o'$, and binding-screws $o$, the die-block itself being adjustably secured to the main frame by screws $o^2$. (See Figs. 3, 4, 14, &c.)

C indicates a carriage or cross-head detachably secured to the lower bar, K. The said carriage is fitted to travel freely back and forth between and upon the vertical extensions of the frame A, which hold the stationary dies.

Immediately adjacent to the stationary die the carriage is planed out longitudinally to receive a die-block, U, similar to the one just described, one or more screws, $o^2$, serving to retain it in position. This latter die-block is in like manner planed out to receive a die, E, a clamp, $o'$, and set-screws $o$ adjustably retaining it in position, the die being similar to the stationary die, but having the ends reversed.

A means, as O, for securing the carriage to the bar K is represented in Figs. 3 and 4, the lower face of the carriage being planed out to receive the bar. A strong lever, $a$, is pivoted at $a'$ to the carriage and adapted to vibrate slightly in an opening formed therein. (See dotted lines.) The inner end of the lever bears against an inverted spiral spring, $a^2$, mounted in a hole formed in the carriage. (See also dotted lines.) The other or outer end of said lever extends beyond the forward end of the carriage, Fig. 4, and is made slightly conical on its under side, at $a^3$, to engage a correspondingly-shaped shallow cavity formed in the face of the bar. A shouldered stud or pin, $a^4$, passes loosely through the lever and is screwed into the bar, a hand-wheel, $a^5$, being firmly secured to and surmounting said stud.

It is evident that when the parts are connected together, as shown in said Fig. 4, the carriage will travel in unison with the lower bar; but by unscrewing the pin $a^4$ therefrom the bar will then travel back and forth in the carriage, the latter being stationary, the spring $a^2$ serving to keep the forward portion of the lever from coming in contact with the bar.

The top face of the carriage is planed out longitudinally to receive the bar L, the latter also being partially fitted into the carrier D, which is gibbed to the carriage. This carrier, which is made somewhat shorter than the carriage, is adapted to be detachably secured to the bar L, substantially as shown sectionally in Fig. 4, wherein a bushing, $d^2$, beveled at its lower end, a stud, $a^4$, and a hand-wheel, $a^5$, operate together, in connection with a guide-plate, $d^3$, to firmly clamp the carrier to the bar. The carrier may be readily disconnected from the bar by simply unscrewing the stud therefrom, thereby permitting the carrier to remain stationary and the bar to travel as usual. The function of the carrier is to longitudinally reciprocate a screw-blank holder, as H, directly over the space formed by the lateral separation of the two threading-dies and at one-half the speed of the traveling die.

The holder consists of a back plate, $e$, a front plate, $e'$, and the two jaws J J, pivoted on a pin, $e^3$, attached to the back plate. The sides of the latter are planed to fit between ways formed in an extension of the carrier, Figs. 4, 10, &c. A slotted opening, $e^8$, is formed in the upper end of the plate $e$ to receive the reduced end of an adjusting-screw, $e^9$, of the carrier, by means of which the holder is adapted to be vertically adjusted. The lower portions of the said jaws J are oppositely recessed at $u'$ $u$ to receive the head and the contiguous portion of the screw-blank $b$, for the purpose of holding the blank in position and then to properly enter it between the grooved faces of the threading-dies. An extension, $u^3$, of the rear jaw serves to keep the blank in a vertical position as it is moved along.

$n$ $n$ indicate oppositely-inclined lugs secured to the jaws. The opposed outer sides of the jaws at the bottom are beveled at $e^5$ to engage the lower portion of the front plate, $e'$, hereinafter described. (See Fig. 18.) A lug or lateral extension, $e^6$, is formed on the lower end of the rear plate, $e$, the bottom face of which is adapted to bear against the upper end of the screw-blank, thereby preventing the latter from moving upwardly.

The front plate or cap, $e'$, is fitted to slide vertically in the ways before referred to, gibs $e^2$, secured to the carrier, serving to retain the plate laterally. The lower portion of the front plate is beveled at $e^4$, for the purpose of engaging the corresponding surface, $e^5$, of the jaws, thereby closing them firmly together. (See Figs. 15, 16.) A lug, $n'$, having angular sides is secured to the back face of the plate $e'$. By means of this construction the plate, in its upward movement, causes the said lug to simultaneously engage the angular projections $n$, thereby forcing the jaws apart, Figs. 10, 11, and freely permitting the threaded blank to drop out at the end of the stroke.

$i^3$ indicates a standard, the same to be adjustably secured to the top of the frame A, adjacent to the entering end of the stationary die E. I is an extension of said standard, the same being adjustably secured thereto by a bolt, $i^4$. The upper part of the piece I is somewhat elongated, and is provided with a groove, $i$, the forward portion of which is made quite flaring, as at $i'$, the groove extending therefrom in a cam-shape form, (see Figs. 22, 23,) the object of the said groove being to receive an extension or pin, $i^2$, of the front plate, $e'$. It is evident now that as the carrier D commences to move ahead in its stroke the pin $i^2$, coming in contact with the enlargement $i'$ of the groove, forcibly draws the plate down to its limit, thereby at the same time firmly closing the jaws until a blank is properly entered between the dies by the continued movement of the carrier. As soon, however, as the blank is fully seized by the dies,(or later, as may be desired,) the cam-shaped portion of the groove $i$ forces the front plate upwardly, Fig. 10, which movement also separates the jaws, the latter remaining separated until the completion of the double stroke.

The blank-feeding device R is as follows, motion being imparted to the several parts thereof by a toothed rod, T, secured to the main cross-head M'.

F indicates a stationary receptacle or "hopper," into which the screw-blanks are emptied. A blade or pick-up, $c^5$, works vertically therein through the medium of a rack, $c'$, Fig. 12, housed in the casing $c^4$, Fig. 2. A gear-wheel, $c^6$, loosely mounted on a stationary stud, $c$, meshing with the rack T, serves, in connection with the splined hub $c^3$ and clutch-wheel $c^7$, to vertically reciprocate the blade $c^5$, from which, when at its elevated position, the blanks which it may have brought up slide into the inclined track or "runway" $d$. The vertical rack $c'$ and its attachments may be readily connected to or disconnected from the revolving gear $c^6$ by means of the said sliding clutch-wheel $c^7$.

G indicates the several parts entering into the construction of the separator and conveyer, by means of which device the blanks are individually taken from the runway and automatically placed in the jaws of the holder preparatory to entering the dies for the purpose of being threaded, said device being secured to the frame A of the machine slightly in advance of the front end of the stationary die. $b'$, referring to the device, indicates the supporting-frame thereof. (See Fig. 6, &c.) The front portion of said frame is planed out vertically to a depth substantially equal to the length of the blank's shank. Into this groove or channel a plate or conveyer, $b^3$, having a thickness of the blank, is fitted to intermittently travel back and forth. A lateral opening, $d'$, formed in the front side of the supporting-frame, near its forward end, coincides with and forms a continuation of the track $d$, Fig. 5. A slotted hollow spindle, $b^2$, is mounted in the frame $b'$, Fig. 25, &c., its outer end being jointed to a slotted pivoted lever, $b^4$, which extends downwardly, and is provided with an adjustable stop, $b^6$, adapted to engage a cam or wedge-shaped block, $w$, adjustably secured to the rack-rod T, Figs. 7, 8. The rear end of the plate $b^3$ is made cylindrical, and is fitted into the chamber of the spindle $b^2$ and opposed by the inclosed cushion-spring $d^5$. A pin, $d^4$, is secured to the rear end of the plate, the same extending through the slotted opening of the spindle and resting against an end of a spring, $b^5$. A pin, $b^9$, is fitted transversely of the frame $b'$, just forward of the vertical slot $d'$. The inner end of said pin bears against the conveyer-plate $b^3$, Fig. 25, &c., while the latter is placing a blank in the holder. Upon retracting or withdrawing the plate past the pin and slot $d'$, the pin is forced ahead by means of a light spring, thereby preventing more than one blank at a time from entering the channel.

For the purpose of cutting off the column of blanks and thereby preventing them from entering the said channel, a pin, $b^8$, (shown by dotted lines in Fig. 6,) is adapted to be forced across the mouth of the opening $d'$ by a hand-lever, $b^7$, pivoted to the upper portion of the frame $b'$ and jointed to the said pin $b^8$.

It will be observed that the drawings represent a double-acting machine—that is to say, a set of threading-dies, together with the necessary feeding mechanism, &c., are mounted and arranged on each side of the machine, so that as a blank is fed to and between the dies at one end of the carriage the latter, in its forward movement, causes the blank to be completely threaded and dropped at the end of the stroke. Upon the return of the carriage on its back stroke, the opposite set of dies receive and thread a blank, which in turn is dropped from the dies at the termination of the stroke, as before. By means of this construction two blanks are threaded during a double stroke of the carriage.

The operation of the several devices more in detail is as follows: The main cross-head M is connected with a pin mounted in the driving-gear $s^3$, so as to travel back and forth in either direction a distance exceeding somewhat twice the length of the stationary grooved die E, mounted in the frame A. The carriage C has a similar die E, reversely arranged and secured thereto, the carriage being reciprocated by means of the bar K, to which it is detachably secured by the clutch O, the bar itself being rigidly secured to the main cross-head, the blank-feeding device R, including the stationary hopper F, runway $d$, &c., being arranged substantially as hereinbefore described, a rack, T, also secured to the main cross-head, serving to move a blade, $c^5$, up and down in the hopper to pick up the blanks.

In the system of "rolling" the threads on screws herewith, the screw travels ahead at a rate of speed exactly one-half that of the traveling die. Therefore the blank guide or holder H and the carrier D must travel at the same rate as the screw. I would state here, referring to Fig. 4, that the jaws of the front holder, H, of the carrier just before reaching the end of its stroke (but subsequent to passing the front end of the stationary die) receives a blank in the cavity $u\ u'$ through the medium of the conveyer $b^3$ and the connected lever $b^4$, the latter being actuated by the engagement of the stop $b^6$ with the wedge-shaped portion of the block $w$, secured to the traveling rod T.

At the instant of passing the forward "dead-center" (see Fig. 4) the blank stands equidistant between the forward end of the front stationary die (shown by dotted lines) and the corresponding end of the rear or traveling die, E. Now, in advancing, the relative speed of the parts C and D causes both the said dies to receive the blank between them, and also to engage it at the same instant from opposite sides, the blank being kept vertical by the extension $u^3$. While thus advancing, the outer or free end of the conveyer is gradually guided rearwardly by means of the inclined surface $d^6$, Figs. 5, 16, of the rear jaw and against the tension of the spring $d^5$. Immediately thereafter the continued movement of the rod T carries the block $w$ away from the stop, the spring $d^5$ withdrawing the conveyer to its limit. (See dotted line position of lever, Fig. 6.) While the blank is axially turning between the dies, the pin $i^2$ enters the cam-shaped groove $i$, thereby moving the front plate, $e'$, upwardly, which in turn forces the jaws apart. The dies, however, still retain the blank in position laterally, while the stop $e^6$ prevents any upward movement. As the parts C and D pass the rear dead-center, the movable die will then have traveled past the rear end of the stationary die, the holder in this position being relatively as far in the rear of the latter and in advance of the former die as at the commencement of the stroke. At this time the now completely threaded screw drops from the jaws into a suitable receptacle beneath. In returning upon the back-stroke the jaws J are closed by means of the passage of the pin $i^2$ along the same cam-groove $i$, the operation being substantially a reversal of the process just described for opening the jaws. As the jaws close, or just preceding their closing, the inclined portion of the cam-block $w$ causes the vertical end of the conveyer to engage a blank and force it past the pin $b^9$ against the inclined surface $d^6$ of the holder, (the latter traveling at the same rate as the cam-block,) and finally into the recess $u\ u'$ thereof, thus completing a double stroke of the cross-head, &c. During the operation of threading a screw, as just described, the process is repeated on the opposite side of the machine, but in a reverse order.

The standards $i^3$ I, before described, are adapted to be adjustably secured to the machine with relation to the stationary dies at any portion of the stroke of the carrier. The latter also is adapted to be adjusted so as to insure the proper relation of the blank to the dies. It is very essential that the feeding device, carrier, and dies be provided with means for adjustment, not only for the purpose stated, but also to accommodate other sizes of blanks. I contemplate elongating the frame A on each side (longitudinally) of the driving-head, and providing the same at suitable intervals with stationary dies E, feeders, &c. At the same time, also, the longitudinal upper and lower bars, L K, are to be proportionately lengthened and provided with a corresponding number of die carriages and carriers C D, respectively. By means of this arrangement it is evident that I add greatly to the producing capacity of the machine, and at the same time lessen the cost of attendance, &c.

By means of combined disconnecting and connecting devices O P one or all of the carriages and carriers may be readily stopped and started at will while the machine is in operation, the respective bars K L at the same time continuously traveling back and forth.

The jaws J of the carrier may be opened at any part of the stroke by simply readjusting the cam-carrying standard.

In the use of the machines herein described it is important that the screw-blank, while being acted upon by the dies, shall stand exactly vertical between them, so that its relation to the ribs or grooves of the opposite dies shall be the same. Otherwise the dies will not act in harmony, and the threads of the screws will not be perfectly formed. The device which I have called a "carrier" performs this important duty. It receives the blanks from the feeding mechanism and presents them vertically to the dies and holds them in that relation until the rolling has so far progressed that the ribs of the dies have entered the metal sufficiently to prevent the blank from turning obliquely across the face of the dies.

This machine may be so modified that the stationary die shall also be made movable, but in the opposite direction from its companion. In such case, though the blank will rotate between the dies, it will not change its position in the machine, and the carrier must be made stationary. It will, however, perform the same duty in receiving the blanks from the feeding mechanism and presenting them to the dies in the proper relation and holding them in such relation as long as may be necessary. Under this construction of the machine the carrier might be more appropriately called a "holder." The cam which operates the jaws of the carrier would also be made movable.

I claim—

1. A blank carrier or holder to receive the blank from a feeding mechanism and present and hold it to the threading-dies in the proper position to be acted upon by the dies, and provided with movable jaws which are closed to hold the blank vertically, and which are opened to release the blank to the control of the dies or to allow it to drop from the machine when the dies have completed their work.

2. The combination of duplicate mechanisms side by side, but reversed in their action, and connected with the same actuating bars or shafts, so as to form a screw during the movement of the shaft in each direction.

In testimony whereof I have affixed my signature in presence of two witnesses.

CHARLES D. ROGERS.

Witnesses:
   CHARLES HANNIGAN,
   GEO. H. REMINGTON.